March 6, 1928.
J. A. OLDSON
1,661,341
SIX-THROW, FOUR-BEARING BALANCED CRANK SHAFT
Filed May 1, 1925
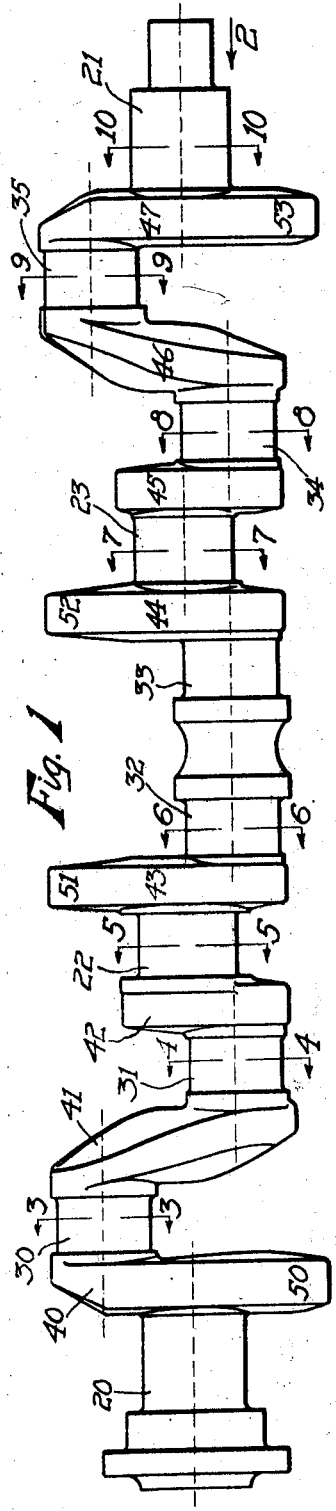
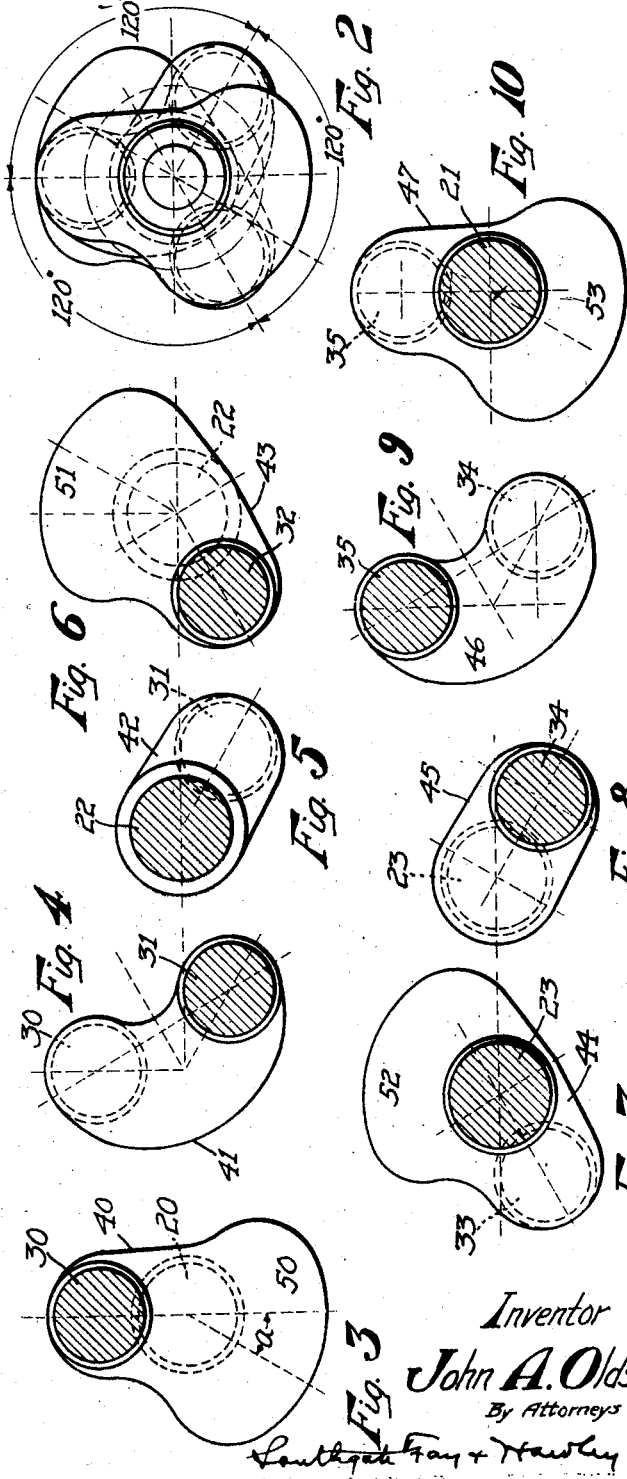
Inventor
John A. Oldson
By Attorneys Patented Mar. 6, 1928.

1,661,341

UNITED STATES PATENT OFFICE.

JOHN A. OLDSON, OF WORCESTER, MASSACHUSETTS, ASSIGNOR TO WYMAN-GORDON COMPANY, OF WORCESTER, MASSACHUSETTS, A CORPORATION OF MASSACHUSETTS.

SIX-THROW FOUR-BEARING BALANCED CRANK SHAFT.

Application filed May 1, 1925. Serial No. 27,282.

This invention relates to a balanced crankshaft of the six-throw four-bearing type. It is well understood that the ordinary six-throw crankshaft, although accurately balanced against static forces, is not balanced against dynamic forces and that serious vibration occurs when the speed is increased above a definite minimum.

It is the object of my invention to provide a construction by which a six-throw four-bearing crankshaft may be accurately balanced both statically and dynamically and without substantial increase in the cost of manufacture.

In the preferred embodiment of my invention, I provide counterweights on the single or straight cheeks adjacent the end shaft bearings, so positioned and proportioned that they substantially offset certain of the unbalanced dynamic forces that act to throw the shaft out of running balance. As it is necessary that the shaft shall also be left in static balance, I provide additional counterweights on the straight or single cheeks adjacent the intermediate shaft bearings to restore the static balance.

By placing these counterweights in certain definite angular relations to the positions of the crank pins, I am able to produce a crankshaft which may be rotated at high speed without noticeable vibration.

With these general objects in view, my invention also relates to certain arrangements and combinations of parts which will be hereinafter described and more particularly pointed out in the appended claim.

A preferred form of the invention is shown in the drawings, in which

Fig. 1 is a side elevation of my improved crank-shaft with counterweights applied thereto;

Fig. 2 is an end view thereof; and

Figs. 3 and 10 inclusive are sectional elevations taken along the section lines having corresponding numbers in Fig. 1.

Referring to Fig. 1, I have shown a balanced crankshaft having end shaft bearings 20 and 21 and intermediate shaft bearings 22 and 23. The shaft is also provided with six crank pins 30, 31, 32, 33, 34, and 35.

A single or straight cheek 40 (Fig. 3) connects the shaft bearings 20 to the crank pin 30; a curved or connecting cheek 41 (Fig. 4) connects the crank pin 30 to the crank pin 31; a straight cheek 42 (Fig. 5) connects the crank pin 31 to the intermediate shaft bearing 22; and a straight or single cheek 43 (Fig. 6) connects the intermediate shaft bearing 22 to the crank pin 32.

Similarly, a straight cheek 44 (Fig. 7) connects the crank pin 33 to the intermediate bearing 23; a straight cheek 45 (Fig. 8) connects the shaft bearing 23 to the crank pin 34; a curved or connecting cheek 46 (Fig. 9) connects the crank pin 34 to the crank pin 35; and a single cheek 47 (Fig. 10) connects the crank pin 35 to the end shaft bearing 21.

All of these parts are or may be of substantially the usual construction in forged crankshafts, with the exception that the single cheeks 40, 43, 44, and 47 are provided with counterweights which will now be described.

Referring particularly to the left half of the crankshaft, as viewed in Fig. 1, I provide the single cheek 40 with a counterweight 50 which is so disposed that it substantially offsets certain of the unbalanced dynamic forces which are generated in the left half of the crankshaft as it is rotated upon its bearings 20 and 22 at relatively high speed. The mass of the counterweight may be so designed that it will counterbalance merely the unbalanced forces generated by the shaft itself, or it may be increased to counterbalance a greater or less part of the forces generated by the connecting rod ends which move with the crank pins.

Both the mass and the angular position of the counterweight 50 may be determined mathematically or graphically for any particular crankshaft under defined conditions.

The center of the counterweight is offset angularly from the center line of the cheek 40 at an angle $a$ which varies somewhat with conditions, but which may be generally defined as not substantially greater than 30° and not substantially less than 10°. In an average case, such as is shown in the drawings, the angle $a$ is approximately 15°.

Having determined the mass and the angular position of the counterweight 50, it is then necessary to add a counterweight 51 of equal magnitude and positioned at exactly 180° from the counterweight 50 in order that the static balance of the shaft may be maintained.

Corresponding counterweights 52 and 53 are provided for the right hand end of the shaft, these counterweights being similarly determined and positioned, and a particular description thereof being considered unnecessary.

The counterweights 50, 51, 52 and 53 may be constructed in any desired manner and may be secured to the crankshaft by bolts or welding or in any other suitable manner. In the preferred form of my invention, however, I forge the counterweights integral with the cheeks 40, 43, 44 and 47, as shown in the drawings, this construction being rendered possible by the forging process disclosed in the prior patent to Larcher, No. 1,434,215, issued Oct. 31, 1922.

After careful and extended tests of crankshafts constructed as above set forth, it has been shown that such crankshafts may be run at much higher speed than has been heretofore practical and that at such speeds no undesirable vibration occurs.

Having thus described my invention and the advantages thereof, I do not wish to be limited to the details herein disclosed otherwise than as set forth in the claims, but what I claim is:—

A six-throw four-bearing crankshaft, having two straight single cheeks and one curved connecting cheek between each end bearing and its adjacent intermediate shaft bearing and having two straight single cheeks between the two intermediate shaft bearings, and having a counterweight applied to each single cheek adjacent the end shaft bearings and to each single cheek between the intermediate shaft bearings and adjacent thereto, the counterweights adjacent the end shaft bearings substantially counterbalancing certain of the unbalanced dynamic forces generated by high speed rotation of the crankshaft, and the counterweights between the intermediate shaft bearings maintaining the static balance of the shaft, the center line of each end counterweight being offset from the projected center line of its supporting crank cheek at an angle of approximately 15° in one direction, and the intermediate counterweights being offset from their supporting crank cheeks and disposed at an angle of substantially 180° with respect to the end counterweights.

In testimony whereof I have hereunto affixed my signature.

JOHN A. OLDSON.